April 16, 1968  P. FIEBELMANN  3,378,454
NUCLEAR FUEL ARRANGEMENT
Filed Aug. 22, 1966  2 Sheets-Sheet 1

INVENTOR
PETER FIEBELMANN

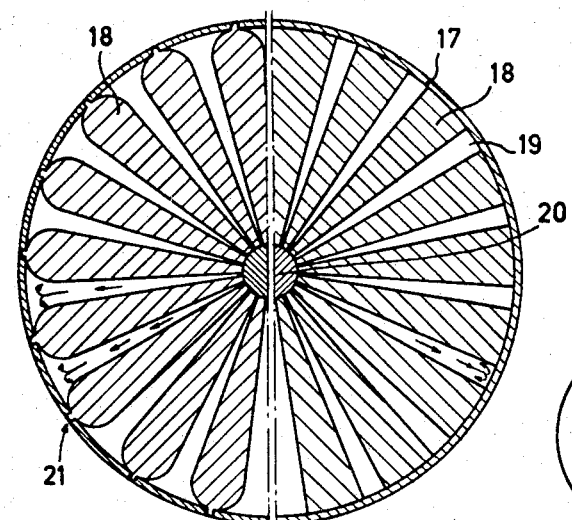
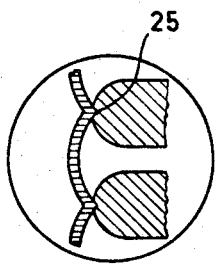
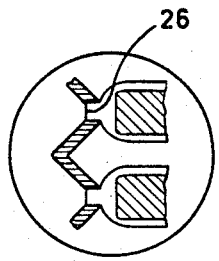
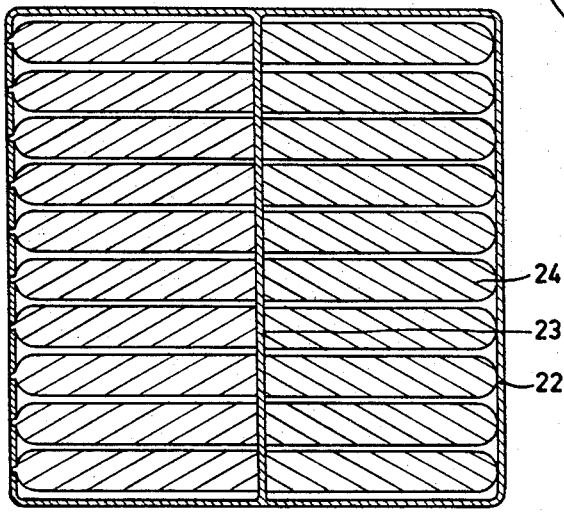

United States Patent Office 3,378,454
Patented Apr. 16, 1968

3,378,454
NUCLEAR FUEL ARRANGEMENT
Peter Fiebelmann, Besozzo, Italy, assignor to European Atomic Energy Community (Euratom), Brussels, Belgium
Filed Aug. 22, 1966, Ser. No. 574,011
Claims priority, application Germany, Sept. 17, 1965, E 30,113
2 Claims. (Cl. 176—72)

ABSTRACT OF THE DISCLOSURE

A nuclear fuel arrangement in which the fuel is divided into parallel strips, the interspace between the strips forming gas-tight chambers which contain a liquid metal heat carrier and have capillary grooves on the chamber walls extending transversely to the axis of the strips. The chambers thus act as heat pipes which transport thermal energy in a radial direction.

---

The invention relates to a nuclear fuel arrangement and is concerned with extraction of the heat of reaction. It is based on a novel arrangement using heat pipes for this purpose. The construction and operation of heat pipes are described in the Journal of Applied Physics, June 1964, pages 1990/91, the pipes comprising a container with a capillary structure and a vaporizable substance therein.

The invention provides a nuclear fuel arrangement in which the fuel is divided into parallel strips or plates with or without individual cladding and with adjacent strips or plates in face-to-face spaced apart relation, in which the strips or plates are received in a casing and together therewith form gas-tight chambers enclosing the spaces between the elements and in which each chamber contains a heat carrier and has on its walls capillary grooves extending transversely to the length of the strips or plates whereby the chambers act as heat pipes for conveying heat from the fuel to the casing walls.

Among the advantages of the invention are that when the invention is applied to a reactor core, the reactor vessel may be of small dimensions and when the invention is applied to a fuel element there is no need to take coolant through the element. These advantages arise from the fact that the heat pipes operate in the core zone in a radially symmetrical arrangement. The capillary grooves extend horizontally or possibly at a slight angle and also may extend towards a maximum gap aperture.

In the case of the reactor core the cladding of the wedge-shaped fuel elements may have horizontal capillary grooves. The elements are inserted in a vessel of the same height and approximately twice their radial extent so that they form a seal at their outer edges. The wall of the vessel may have corresponding horizontal capillaries (annular capillaries), and smooth covers seal the vessel at top and bottom.

In the case of the fuel element the same configuration is used but the fuel cladding takes the place of the vessel and the plugs take the place of the covers.

In the fuel arrangement above described the heat carrier circulates horizontally from the inside outwards and back to the inside. It never leaves the vicinity of the fissile material. This manner of operation is much facilitated by a funnel-like flaring of the gaps, since the quantity of vapor increases as evaporation proceeds.

Some specific embodiments of the invention will now be described in greater detail with reference to the accompanying drawings in which:

FIGURE 3a is a horizontal section through one half of a nuclear fuel element having stripes of fuel like sections of cake;

FIGURE 3b is a variant of the nuclear fuel element shown in FIGURE 3a,

FIGURE 4 shows a nuclear fuel element of the type shown in FIGURE 3a, but with a square cross-section; and FIGURES 5a, 5b are partial horizontal sections through two examples showing how the fuel element and element cladding touch and how the cladding may be shaped for the embodiments shown in FIGURES 3a, 3b or 4.

Figure 1:
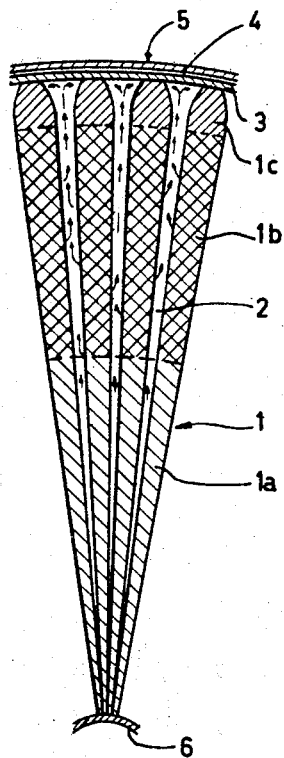
FIGURE 1 is a horizontal section through part of a reactor core with wedge-shaped fuel elements shaped like sections of a round cake.

In FIGURE 1 the fuel elements 1 consist of the fissile material 1a, reflector 1b and structural material 1c. In accordance with the invention vapor gaps 2 between the elements operate as heat pipes, as indicated by arrows. The figure also shows the core vessel wall 3, and expansion gap 4 with helium for thermal coupling, the wall 5 of the reactor pressure vessel enclosing the reactor core and a central pipe 6 for anchoring the fuel elements and receiving an absorber rod.

Figure 2:
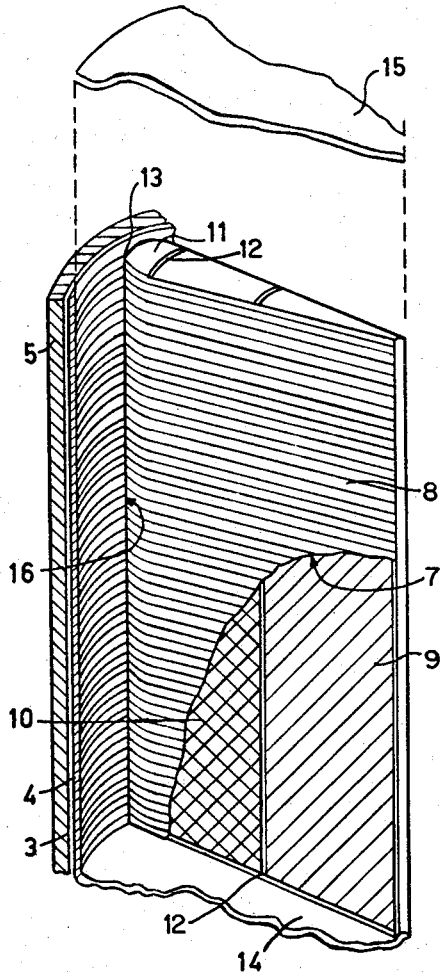
FIGURE 2 is a perspective view of a nuclear fuel element for the core shown in FIGURE 1.

The individual fuel element shown in FIGURE 2 has cladding 7 with horizontally parallel capillary grooves 8 of rectangular cross-section. It contains the fuel insert 9, reflector insert 10 and structural material insert 11 separated by partitions 12. The core vessel wall 3 also has horizontally parallel capillary grooves corresponding to those on the fuel element. As FIGURE 1 also shows, strips 13 along the outer edges of the fuel elements engage in corresponding breaks in the core wall, to which they are welded.

The core vessel is closed at top and bottom by cover plates 14, 15.

Where the fuel element joins the core vessel groove joints 16 arise on both side, forming further capillaries which favor distribution of the returning condensate to the capillaries on the fuel element. The heat carrier circulating in the gaps may for example be lithium.

FIGURES 3a, 3b show how the idea just described for a reactor core can be applied to a fuel element. The parts 17, 18—functionally comparable with the core vessel wall and fuel elements in FIGURES 1, 2—are the fuel element cladding and the fuel, which is in strip form. The cladding and strips, with the top and bottom plugs for the element, form the heat pipe chambers 19. They have horizontal capillary grooves. In the axis of the element a rod 20 holds the inside edges of the fuel strips. The outside edges of the strips in FIGURE 3a have strips 21 engaging in and welded to the fuel cladding. Arrows indicate the path of the heat carrier in the gaps.

A fuel element of the form described may be used in a conventional reactor with normal through-flow cooling.

The fuel element shown in FIGURE 4 differs from that in FIGURES 3a, 3b only in the shape and the parallel arrangement of the fuel strips. Otherwise the same applies as in the case of the cylindrical fuel element. The cladding 22 is box-shaped and has a partition 23, and the fuel strips 24 are plates tapering slightly outwards.

Finally, FIGURES 5a, 5b show how the surface area of the fuel cladding can be increased by making it with curves and angles. In FIGURE 5a the outsides of the fuel strips have a longitudinal notch 25 in which the breaks of the curves engage. In FIGURE 5b the fuel strips are anchored by strips 26 in holes in the cladding.

It is to be understood that, in use, the heat of reaction vaporizes the heat carrier (lithium) in the regions of the spaces 2 between the fuel strips, the vapor is condensed in or near the vessel wall and the liquid returns to the heating region by capillary action.

I claim:
1. A nuclear fuel arrangement comprising a plurality of strips of fuel, a casing, said fuel strips being mounted in said casing in a face-to-face, parallel, spaced relation to form a plurality of gas-tight chambers between adjacent fuel strips and said casing, a liquid metal heat carrier substantially filling each said chamber, a plurality of capillary grooves on the walls of said chambers extending substantially transversely to the longitudinal axis of said fuel strips whereby said chambers act as heat pipes for conveying heat from the fuel and the casing.
2. A nuclear fuel arrangement according to claim 1 in which said fuel strips have a substantially wedge shaped cross section, said fuel strips being mounted in said casing radially about an axis of symmetry, the other extremities of said fuel strips being fixed to said casing, and top and bottom covers sealing closing said casing.

References Cited

UNITED STATES PATENTS 3,229,759   1/1966   Grover _____ 165—105

FOREIGN PATENTS 603,846   8/1960   Canada.

BENJAMIN R. PADGETT, *Primary Examiner.*

CARL D. QUARFORTH, *Examiner.*

M. J. SCOLNICK, *Assistant Examiner.*